UNITED STATES PATENT OFFICE.

OLIVER T. HUNGERFORD, OF BROOKLYN, NEW YORK.

PLASTIC COMPOUND.

SPECIFICATION forming part of Letters Patent No. 725,968, dated April 21, 1903.

Application filed May 21, 1900. Serial No. 17,448. (No specimens.)

*To all whom it may concern:*

Be it known that I, OLIVER T. HUNGERFORD, a citizen of the United States of America, residing in the borough of Brooklyn, city of New York, and State of New York, have invented a certain new and useful Improvement in Plastic Compounds, of which the following is a description.

The object of the improvement is the production of a plastic compound susceptible of various uses—such, for instance, as the formation of insulating bases or mediums—it being electrically a non-conductor.

The improvement consists in a compound composed of three elements, viz: first, a base which is essentially and largely a silicate, such as almost pure sand or talc or kaolin; second, a binder, such as rosin or asphaltum, the former being exactly as serviceable as the latter, but less expensive, and, third, a non-drier, which might possibly be a non-drying mineral oil, such as paraffin-oil, though I prefer and hereinafter have claimed a non-drying vegetable oil, such as rosin-oil. To this compound may also on occasions be added a fourth element to render it fireproof and which I will call, fourth, the "fireproofer," such as oxid of zinc, oxid of lead, or alum.

A practical procedure in making the compound is to first melt the rosin in a suitable vessel. When it is melted, add the rosin-oil or paraffin-oil and stir the two well together, and then add the pulverized silica, talc, or kaolin, stirring it in intimately and thoroughly as it is added till the required consistency is reached. The compound thus made when allowed to cool under normal conditions of the atmosphere becomes a solid which has somewhat of elasticity and a great degree of tenacity in its constituent parts. It can be by the use of molds or the like formed as it solidifies into any desired shape.

In order to make this compound to a great degree non-inflammable or fireproof, there may be added to the compound while it is hot and fluid oxid of zinc, oxid of lead, or alum, the addition of the fireproofing element being made when it is in a powdered condition.

The use of the non-drier (herein described as a vegetable oil) in the making of this compound is specially valuable, because it renders the solid compound pliable and to a degree elastic, a quality which is very much desired in using this compound in certain places for electric insulation—as, for instance, in a conduit liable to be disturbed by the action of frost.

The proportions of the materials which may be profitably employed are approximately as follows: of the silica, talc, or kaolin about eight-tenths, (by weight,) about one-tenth of rosin, and about one-tenth of rosin-oil. To make the compound non-inflammable to a degree, there may be added about one-hundredth part of the compound (by weight) of the oxid of zinc, oxid of lead, or alum.

I claim as my improvement—

1. A plastic compound for use as an insulator, the same composed of a silicious base, a binder, and rosin-oil.

2. A plastic compound for use as an insulator, the same composed of a silicious base, a binder, a non-drier such as rosin-oil, and a fireproofing element.

3. A plastic compound for use as an insulator, the same composed of a silicious base, a resinous binder, and rosin-oil.

OLIVER T. HUNGERFORD.

Witnesses:
 A. A. PHIPPS,
 EDWARD B. MERRILL.